United States Patent
Cheung et al.

(10) Patent No.: US 7,026,798 B2
(45) Date of Patent: Apr. 11, 2006

(54) MULTI-CHANNEL DRIVER INTERFACE CIRCUIT FOR INCREASING PHASE COUNT IN A MULTI-PHASE DC-DC CONVERTER

(75) Inventors: Chun Cheung, Brooklyn, NY (US); Matthew B. Harris, Raleigh, NC (US)

(73) Assignee: Intersil Americas Inc., Milpitas, CA (US)

( * ) Notice: Subject to any disclaimer, the term of this patent is extended or adjusted under 35 U.S.C. 154(b) by 66 days.

(21) Appl. No.: 10/887,610

(22) Filed: Jul. 9, 2004

(65) Prior Publication Data

US 2005/0088156 A1    Apr. 28, 2005

Related U.S. Application Data

(60) Provisional application No. 60/520,112, filed on Nov. 14, 2003, provisional application No. 60/514,758, filed on Oct. 27, 2003.

(51) Int. Cl.
*G05F 1/613* (2006.01)
(52) U.S. Cl. .................. 323/225; 323/271; 323/283
(58) Field of Classification Search ........... 323/225, 323/271, 282, 283, 284
See application file for complete search history.

(56) References Cited

U.S. PATENT DOCUMENTS

| | | | | |
|---|---|---|---|---|
| 6,246,220 B1 | 6/2001 | Isham et al. | ................. | 323/224 |
| 6,879,137 B1* | 4/2005 | Sase et al. | .................. | 323/282 |
| 6,906,500 B1* | 6/2005 | Kernahan | .................... | 323/225 |
| 6,912,144 B1* | 6/2005 | Clavette | ...................... | 363/98 |
| 6,922,044 B1* | 7/2005 | Walters et al. | .............. | 323/288 |

* cited by examiner

*Primary Examiner*—Adolf Berhane
(74) *Attorney, Agent, or Firm*—Allen, Dyer, Doppelt, Milbrath & Gilchrist, P.A.

(57) ABSTRACT

A reduced pin count, dual channel driver interface is configured to interface a supervisory controller with a plurality of multi-phase output channel switching circuits of a multi-phase DC-DC regulator. Each dual channel driver is configured for placement relatively close to output channel sense points, so as to effectively reduce the distance that would otherwise have to be traversed by noise sensitive voltage signals. Sensed current representative signals are processed within the dual driver for current balance between a respective multi driver pair, and are combined to supply the controller with the average current signal of the dual channels. The controller uses this average current-information to adjust respective pulse width modulation signals that are supplied to the dual channel drivers.

36 Claims, 5 Drawing Sheets

MULTI-CHANNEL DRIVER INTERFACE CIRCUIT FOR INCREASING PHASE COUNT IN A MULTI-PHASE DC-DC CONVERTER

CROSS-REFERENCE TO RELATED APPLICATIONS

The present application claims the benefit of previously filed, co-pending U.S. Application Ser. No. 60/514,758, filed Oct. 27, 2003, by Chun Cheung et al, entitled: "Method of Doubling the Phase Count in a Multi-Phase DC-DC Converter," and co-pending U.S. Application Ser. No. 60/520,112, filed Nov. 14, 2003, by Chun Cheung, entitled: "Novel Current Balance Technique for Smart Dual Driver," each application being assigned to the assignee of the present application and the disclosures of which are incorporated herein.

FIELD OF THE INVENTION

The present invention relates, in general, to multi-phase DC-DC regulator systems and subsystems therefor, and is particularly directed to the use of multi- (e.g., dual) channel driver circuits to interface a supervisory controller with a plurality of multi-phase output channel switching circuits. The multi-channel driver circuits, which contain current sensing circuitry, can be conveniently placed close to various output channel sense points, so as to effectively reduce the distance that would otherwise have to be traversed by noise sensitive voltage signals. Sensed current-representative signals are processed within the dual driver for current balance between a respective multi driver pair, and are combined to supply the controller with a voltage signal representative of the average current for each driver. The controller uses this average current-information to adjust respective pulse width modulation (PWM) signals that are supplied to the dual-channel drivers.

BACKGROUND OF THE INVENTION

There is currently a market-driven need to extend the phase count in multi-phase DC-DC regulator systems beyond a number that can be practically supported by conventional multi-phase systems. Multi-phase systems use a controller to regulate the power delivered by more than one power channel to a load. In many conventional systems, the controller regulates the voltage level at the load by sending each remote power channel a stream of PWM with precisely controlled widths. These PWM signals are sequenced and timed such that the interval between rising edges (or in some implementations, falling edges) of pulses delivered to each remote power channel is constant.

In typical implementations, each power channel includes a channel driver integrated circuit (IC) and a power stage containing one or more power semiconductor switches. In a conventional system, a supervisory controller IC regulates the pulse width of each of the connected driver ICs. Each of the connected driver ICs, in turn, controls a semiconductor switch to periodically connect the input power source to the output load. In many instances, the driver IC also controls a second semiconductor switch in a method commonly known as synchronous rectification. These systems often measure the current from each power channel and use the information to modify the pulse widths independently in a manner that effectively equalizes the current delivered by each power channel. The sum of the current measurements is also used to precisely regulate the output resistance in a method commonly known as droop regulation or load-line regulation. Both of these functions are commonly implemented in the controller, so that signals must be transmitted from the remote power channels back to the controller.

In a conventional multichannel layout, such as that outlined above, there are at least two signals between the controller and each power channel. In some implementations, there are three signals between each power channel and the controller, while in other, less-common implementations, there may be eight or more. Since the number of pins on the controller dedicated to communicating with the power channels increases along with the number of power channels, there is a corresponding increase in the cost of the controller and in the difficulty of routing the signal traces near the controller.

Moreover, the distances from the controller to the most remote power channels increase as the number of power channels increases. This compounds the difficulty faced by the system designer to preserve signal integrity of the sensitive current-sense lines as they traverse long distances through a noisy environment. This is due to the fact that the signals transmitted on the current-sense lines are voltage signals proportional to current, and voltage signals are prone to corruption from capacitively-coupled noise.

SUMMARY OF THE INVENTION

The present invention addresses both the problem of excessive controller pin count and that of long, sensitive signal lines in a noisy environment. In addition, it provides a technique for achieving current balance between multiple channel drivers. The issue of excessive pin count is addressed by increasing (doubling) both the number of power channels being controlled by a single PWM signal, and the number of power channels transmitting current-sense signals to a single current-sense input. The issue of integrity of the current-sense signals is addressed by placing the current sense circuitry within the dual driver interface. Unlike the controller, the dual drivers can conveniently be placed close to the sense points. This reduces the distance traversed by the noise sensitive voltage signals. The signals are used within the dual driver interface for current balance, and are combined and reproduced as a current signal to be transmitted back to the controller. As noted above, current signals have greater noise immunity than voltage signals. In accordance with various embodiments of the invention, this is accomplished without any modification to the existing controller.

Pursuant to a first embodiment, the multi-phase DC-DC converter of the present invention includes a supervisory controller that controls a plurality of (e.g., four) output channels. The supervisory controller produces a pulse width modulation (PWM) signal at a first PWM output port for application to the PWM input port of a first dual channel driver of a pair of dual channel drivers. The PWM output signal is processed by the first dual channel driver into a pair of PWM control signals having a prescribed phase delay therebetween. These two PWM signals are used to generate pairs of upper and lower gate switching signals for controllably switching a pair of A and B channel switching circuits, whose outputs are combined with outputs of a second pair of A and B channel switching circuits of second dual channel driver to realize a composite (four phase) output power signal that is applied to a load. Each dual channel driver is coupled to an associated A channel switching circuit comprised of an upper MOSFET switch and a lower MOSFET switch, and a B channel switching circuit comprised of an upper MOSFET switch and a lower MOSFET switch.

To monitor the average current delivered by a respective dual channel driver, the controller includes a first current sense (ISEN1+) input port that is coupled to a composite current sense output IOUT port of the dual channel driver. This IOUT port provides an average of differentially sensed output currents that have been monitored at respective pairs of current monitoring ports (ISENA+ ISENA−) and (ISENB+ ISENB−) from the first pair of A and B channel switching circuits.

Within a respective dual channel driver, the PWM control signal supplied from the supervisory controller is coupled to a channel A gate control logic section, which generates gate or switching control signals to an output channel switch A of a pair of A and B channel switching circuits. To monitor output current for channel A, the output node of an output inductor is coupled to an ISENA+ port of dual channel driver. Within the dual channel driver, the ISENA+ port is coupled to an A channel differential sensing amplifier. A node at the common connection of a resistor and a capacitor, which are coupled in parallel with the inductor in such a fashion that a voltage is created across the capacitor that is proportional to the current in the inductor, is coupled to an ISENA+ port. This port, in turn, is coupled to the A channel differential sensing amplifier.

For controlling the operation of the B channel switching circuit, the PWM input port is coupled to an PWM signal edge delay circuit, which imparts a prescribed delay relative to either the falling edge of the PWM signal supplied to the PWM port or to the leading edge of that PWM signal For a four-phase configuration, the delay is one-half cycle. The amount of delay may be fixed, as by use of an external programming resistor coupled to a programmable delay pin, it may be digitally programmable by control of a reference input to the delay pin, or an alternative functionally equivalent mechanism may be used to set the delay.

The output of the delay circuit is coupled to a pulse width control circuit. This control circuit is operative to controllably adjust or set the width of the delayed high-side or low-side gate pulse, in accordance with an error value produced by a differential error amplifier. The inputs of the error amplifier are coupled to the output of the A channel differential sensing amplifier and the output of the B channel differential sensing amplifier. The output of the pulse width control circuit is coupled to a B channel gate control logic section. This gate control logic section, like the A channel control logic section, is used to apply gate or switching control signals to the output channel B switch circuit.

Output current monitoring for channel B is accomplished in the same manner as for channel A, by coupling the downstream end node of an output inductor to an ISENB+ port, which is coupled to a B channel differential sensing amplifier. In addition, a node at the common connection of a resistor and a capacitor, coupled in parallel with the B channel output inductor in such a fashion that a voltage is created across the capacitor that is proportional to the current in the inductor, is coupled to an ISENB+ port, for application to the channel B differential sensing amplifier. To derive a measure of the average of the output currents produced by the A and B channels, the outputs of the A and B channel differential sense amplifiers are coupled to an adder to produce a composite sensed value, which is averaged via a divide-by-two divider and coupled to a current generator, the output of which is coupled to the IOUT port.

The operation of the dual driver circuitry of the first embodiment is as follows. As described above, each of the two dual drivers contains two output channel drivers (a channel A driver section (containing two switching circuit channels) and a channel B driver section (containing two switching circuit channels). For the dual driver architecture of the first embodiment, respective PWM signals PWM1 and PWM2 generated by the controller directly control the switching operation of the A channel switching circuits, while the delayed and pulse width-adjusted versions of these respective PWM signals control the switching operation of the B channel switching circuits.

As noted previously, the width of the channel B PWM pulse is adjusted relative to that of the channel A PWM pulse in accordance with the error signal produced by the error amplifier. Where the output of amplifier is positive, it is inferred that the A channel pulse widths are wider than those of the B channel, so that pulse width control circuit increases the width of the delayed PWM signal applied to the B channel gate control logic section. Conversely, if the output of the error amplifier is negative, it is inferred that the A channel pulse widths are wider than those of the B channel, so that pulse width control circuit decreases the width of the delayed PWM signal applied to the channel B gate control logic section. The actual width of the PWM signal applied to the PWM port of a respective dual channel driver is based upon a comparison by the controller of the IOUT signals supplied thereto from the various multi-channel drivers. For a four-phase embodiment the controller compares the average current signals coupled to its current sense input ports ISEN1+ and ISEN2+ and adjusts the pulse widths of its two output PWM signals PWM1 and PWM2.

In accordance with a second embodiment of a respective dual channel driver, the output of the error amplifier is used to control gate turn-off propagation delay of high side gate drive (for trailing edge PWM signals) or turn-off delay of low side gate drive (for leading edge PWM signals), so as to provide current balance between the A and B channels. Pursuant to this embodiment, the pulse width control circuit of the first embodiment is replaced by combinational logic which is effective to implement the leading edge- or trailing edge-based pulse width control timing control. The output of timing control logic may be coupled to either the channel B driver circuitry or to both the channel A and channel B driver circuitry.

More particularly, in the second embodiment, the dual channel's driver PWM input port, to which the PWM control signal from the system controller is supplied, is coupled through a fixed delay element to the channel A control logic section. This delay element delays the PWM signal by a fixed amount of delay designed to accommodate inherent signal propagation delay (but not the programmed delay) through a delay installed in the B channel signal propagation path. The output of this delay element is coupled to the channel A control logic section, the output of which is coupled to channel A driver circuitry that drives the load. The PWM input port is further coupled to a programmable delay that imparts a prescribed amount of delay to the PWM signal supplied by the controller in accordance with the number of channels being driven. The output of this delay is coupled to the channel B control logic section which has its output coupled to channel B driver circuitry, to which the output of the timing control logic is supplied;

Operation of the second embodiment is as follows. Considering first the case of controlling the output MOSFETs' gate turn-off propagation delay of low side gate drive for trailing edge PWM signals, in response to the PWM signal supplied by the controller changing state (e.g., going high), after the end of a prescribed delay, the drive supplied by channel A driver goes low, turning off the low side MOSFET of channel A. Next, the gate drive to the high side MOSFET is then turned on, as the output of its drive supplied by the channel A driver goes high. At the end of the duty cycle or width D of the PWM pulse, the gate drive to the high side MOSFET supplied by the channel A driver goes low-turning off the high side channel A MOSFET. Thereafter, the low side channel A MOSFET is turned on, as its gate drive goes from low to high. This cycle repeats itself for subsequent PWM signals supplied by the controller.

On the B channel side, due to the programmable delay imparted by the delay (plus distortion inherent in passing through that delay), the trailing edge of the PWM signal from the controller is delayed a prescribed delay period or phase offset. At the end of the prescribed delay controlled by the timing logic, the low side gate drive supplied by channel B driver goes low, turning off the low side MOSFET of channel B. Where the current sense inputs to the error amplifier indicate that the current drawn by channel A is less than that drawn by channel B, the leading edge of the B channel low side gate drive signal will go low later than the case where the current being drawn by channel A is greater than that drawn by channel B. In the latter case, the leading edge of the B channel low side gate drive signal go low earlier. In this manner the currents for the two channels are made to balance one another.

Next, the gate drive to the channel B high side MOSFET is turned on, as the output of its drive supplied by the channel B driver goes high. At the end of the duty cycle of the PWM pulse, the gate drive to the high side MOSFET supplied by the channel B driver goes low-turning off the high side channel B MOSFET. Thereafter, the low side channel B MOSFET is turned on, as its gate drive goes from low to high. As in the case of channel A this cycle repeats itself for subsequent PWM signals supplied by the controller.

For the case of controlling the output MOSFETs' gate turn-off delay of the high side gate drive for leading edge PWM signals, in response to the PWM signal going high, the drive supplied by channel A driver goes low, turning off the low side MOSFET of channel A. The gate drive to the high side MOSFET is then turned on, as the output of its drive supplied by channel A driver goes high. After the propagation delay imparted by the distortion delay element, subsequent to the termination of the duty cycle or width D of the PWM pulse, the gate drive to the high side MOSFET supplied by the channel A driver goes low-turning off the high side channel A MOSFET. Then, the low side channel A MOSFET is turned on, as its gate drive supplied by the A channel output driver goes from low to high. This cycle repeats itself for subsequent PWM signals supplied by the controller.

On the B channel side, due to the programmable delay, the leading edge of the PWM signal from the controller is delayed a prescribed delay period or phase offset. Next, the drive supplied by channel B driver goes low, turning off the low side MOSFET of channel B. The gate drive to the channel B high side MOSFET is then turned on, as the output of its drive supplied by the channel B driver goes high. At the end of the duty cycle or width of the PWM pulse, the PWM signal goes low. Then following a prescribed interval after the trailing edge of the PWM signal, as controlled by the timing logic, the gate drive to the high side MOSFET supplied by the channel B driver goes low-turning off the high side channel B MOSFET. The low side channel B MOSFET is then turned on, as its gate drive goes from low to high. Where the current sense inputs to the error amplifier indicate that the current drawn by channel A is less than that drawn by channel B, the trailing edge of the drive signal for the upper gate will go low earlier within the adjustment window than the case where the current being drawn by channel A is greater than that drawn by channel B. In the latter case, the trailing edge of the high side gate will go low later.

DETAILED DESCRIPTION

Before describing the multi-channel driver interface in accordance with the present invention, it should be observed that the invention resides primarily in a modular arrangement of conventional power supply circuits and electronic signal processing circuits and components therefor. In a practical implementation that facilitates packaging in a hardware-efficient equipment configuration, these modular arrangements may be readily implemented as combinational logic and discrete circuitry, or application specific integrated circuit (ASIC)-based chip sets. Consequently, the configuration of such an arrangement of circuits and components and the manner in which they are interfaced with one another have, for the most part, been illustrated in the drawings by readily understandable block diagrams, which show only those specific details that are pertinent to the present invention, so as not to obscure the disclosure with details which will be readily apparent to those skilled in the art having the benefit of the description herein. The block diagram illustrations are primarily intended to show the major components of the multiple driver-based interface of the invention in a convenient functional grouping, whereby the present invention may be more readily understood.

Figure 1:
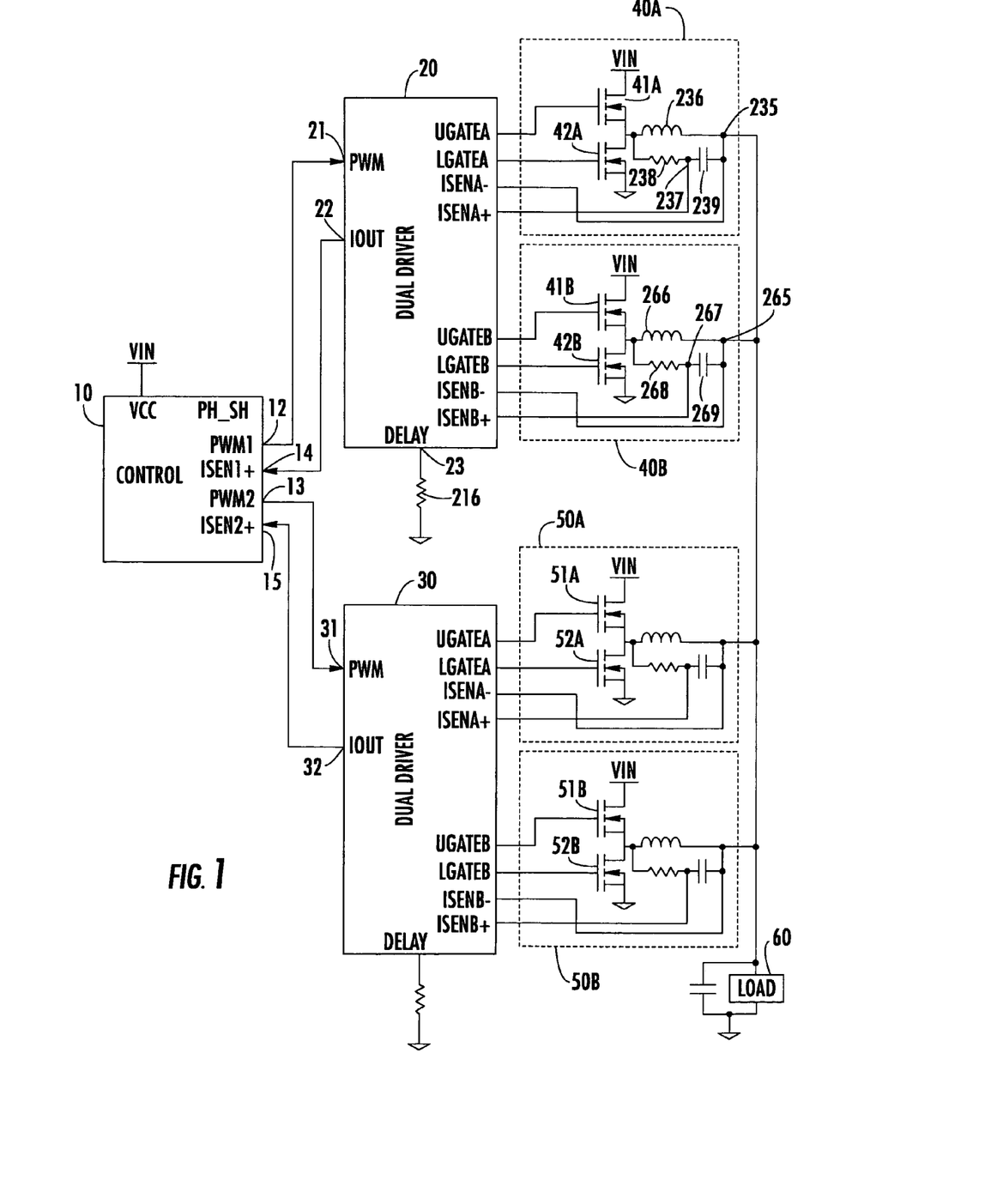
FIG. 1 is an overall block diagram of a four-phase DC-DC converter system in accordance with the present invention.

Attention is initially directed to FIG. 1, which is an overall block diagram of a multi-phase (e.g., four-phase, as a non-limiting example) DC-DC converter system in accordance with the present invention. It is to be noted that the invention is not limited to this or any particular number of phases; four phases have been chosen to reduce the complexity of the drawings. A practical application may include up to eight or more phases. As shown in FIG. 1, the multi-phase DC-DC converter of the invention comprises a supervisory controller 10, such as but not limited to an ISL6561 controller IC manufactured by Intersil Corp. This controller IC is capable of controlling up to four individual channel drivers and, for this purpose, contains a respective PWM port and a pair of complementary polarity current sense ports ISENi+ and ISENi− for each of the four channels.

Since the dual driver interface of the invention does not require the use of each of these ports, only those employed in the embodiments of the invention have been illustrated, so as to reduce the complexity of the drawings. As will be described, what would otherwise require twelve port connections (and therefore twelve conductor traces for the four driver channels) for a four phase system can be accomplished in accordance with the invention using only four ports. As a result, ports other than those actually required for implementing a four phase system have been omitted from the drawings.

The supervisory controller 10 produces a pulse width modulation (PWM) signal at a first PWM1 output port 12, for application to a PWM input port 21 of a first (upper as viewed in FIG. 1) dual channel driver 20 (first and second embodiments of which will be described below with reference to respective sets of FIGS. 2–5 and 6–8). As will be described, the PWM output signal produced at the first PWM1 output port 12 is processed by the dual channel driver 20 into a pair of PWM control signals having a prescribed phase delay therebetween. These two PWM signals are used to generate pairs of upper and lower gate switching signals UGATEA, LGATEA and UGATEB, LGATEB for controllably switching on and off a first pair of A and B channel switching circuits 40A and 40B, whose outputs are combined with the outputs of a second pair of A and B channel switching circuits 50A and 50B to realize a composite multi-(four) phase output power signal that is applied a downstream load 60.

As shown in FIG. 1, in association with the upper dual channel driver 20, the A channel switching circuit 40A is comprised of an upper MOSFET switch 41A and a lower MOSFET switch 42A, while the B channel switching circuit 40B is comprised of an upper MOSFET switch 41B and a lower MOSFET switch 42B. Likewise, in association with the lower dual driver 30, A channel switching circuit 50A is comprised of an upper MOSFET switch 51A and a lower MOSFET switch 52A, while B channel switching circuit 50B is comprised of an upper MOSFET switch 51B and a lower MOSFET switch 52B.

For the upper dual channel driver 20, the controller further includes a first current sense (ISEN1+) input port 14 that is coupled to a 'composite' current sense output IOUT port 22 of dual channel driver 20. As will be described, the IOUT port 22 provides an average of differentially sensed output currents that have been monitored at respective pairs of current channel monitoring ports (ISENA+ ISENA−) and (ISENB+ ISENB−) from the first pair of A and B channel switching circuits 40A and 40B.

Likewise, for the second pair of output channel switching circuits 50A and 50B, the supervisory controller 10 produces a second PWM2 signal at a second PWM output port 13, for application to the PWM input port 31 of the second dual channel driver 30, which is configured the same as that of first dual channel driver 20. As in the case of dual channel driver 20, the PWM output signal produced at the controller's second PWM2 output port 13 is processed by dual channel driver 30 into a pair of PWM control signals having a prescribed phase delay therebetween. These two PWM signals are used to generate upper and lower gate switching signals UGATEA, LGATEA and UGATEB, LGATEB for controllably switching on and off the MOSFETS that make up the A and B channel switching circuits 50A and 50B. As described above, the outputs of this second pair of A and B channel switching circuits 50A and 50B are combined with the outputs of the first pair of A and B channel switches 40A and 40B to realize a composite multiphase output power signal that is applied to load 60.

In association with the dual channel driver 30, controller 10 includes a second current sense (ISEN2+) input port 15 that is coupled to a 'composite' current sense output IOUT port 32 of dual channel driver 30. Similar to the case of the IOUT port 22 of dual channel driver 20, the IOUT port 32 of dual channel driver 30 provides an average of differentially sensed output currents that have been fed back to respective pairs of current channel monitoring ports (ISENA+ ISENA−) and (ISENB+ ISENB−) from the pair of A and B channel switches 50A and 50B.

Figure 2:
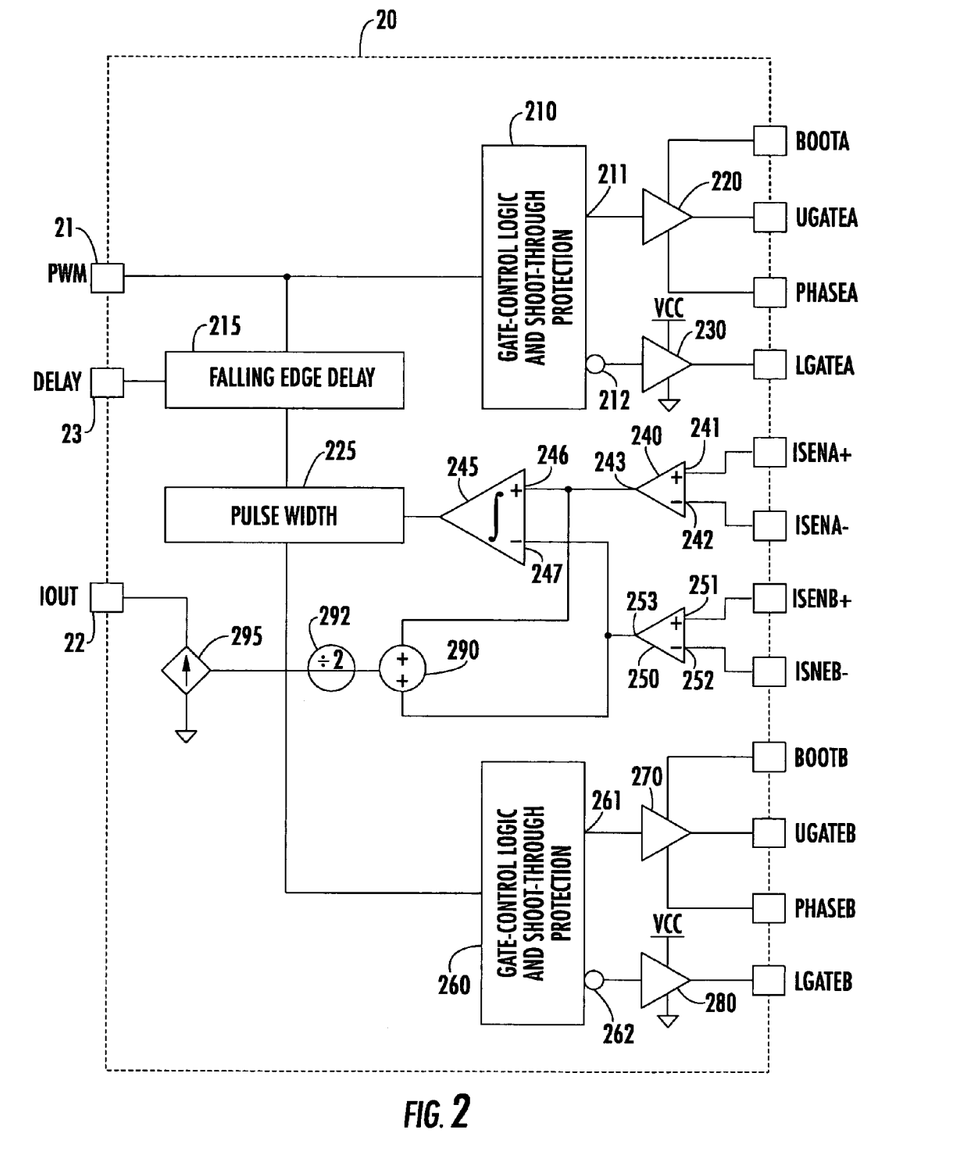
FIG. 2 shows the circuit architecture of a first embodiment of a respective one of the dual channel drivers of the DC-DC converter architecture of FIG. 1.

Attention is now further directed to FIG. 2, which shows the circuit architecture of a first embodiment of each of the dual channel drivers 20 and 30. To reduce the complexity of the drawings, the following description will pertain to dual channel driver 20, it being understood that the description and illustration thereof applies equally to the dual channel driver 30 without any loss in generality. As shown in FIG. 2, the PWM input port 21, to which the PWM control signal is supplied from the supervisory controller 10, is coupled to a first A channel gate control logic section 210, which is of conventional configuration, and is used to apply gate or switching control signals to the 'upper' output channel switch 40A of the first pair of A and B channel switching circuits 40A and 40B.

For this purpose, gate control logic section 210 supplies a first output 211 through a first driver amplifier 220 to the UGATEA output for application to the gate of an upper MOSFET switch 41A of the A channel switching circuit 40A. Driver amplifier 220 is coupled to a boot voltage pin BOOTA and to a PHASEA pin at which operational voltages are coupled. Gate control logic section 210 further supplies a second (inverted) output 212 through a second driver amplifier 230 to the LGATEA output for application to the gate of a lower MOSFET switch 42A of the A channel switching circuit 40A.

As further shown in FIG. 1, output current monitoring for channel A is accomplished by coupling the downstream end or output node 235 of an output inductor 236 to an ISENA− port of dual channel driver 20. As shown in FIG. 2, within the dual channel driver, the ISENA− port is coupled to the inverting (−) input 241 of an A channel differential sensing amplifier 240. A node 237 at the common connection of a resistor 238 and a capacitor 239, which are coupled in parallel with the inductor 236 in such a fashion that a voltage is created across the capacitor that is proportional to the current in the inductor, is coupled to an ISENA+ port, which is coupled to the non-inverting (+) input 242 of the A channel differential sensing amplifier 240.

For controlling the operation of the B channel switching circuit, the PWM input port 21 is further coupled to an PWM signal edge delay circuit 215, which is configured to impart a prescribed delay relative to either the falling edge of the PWM signal supplied to port 21, as is the case with leading edge modulation, or to the leading edge of that PWM signal, as is the case with trailing edge modulation. The delay is typically one-half cycle. The amount of delay may be fixed, as by use of an external programming resistor coupled to a DELAY pin 23, as shown at 216 in FIG. 1, it may be digitally programmable by control of a reference input to the DELAY pin 23 or an alternative functionally equivalent mechanism to set the delay.

The output of delay circuit 215 is coupled to a pulse width control circuit 225. This control circuit is operative to controllably adjust or set the width of the delayed pulse, in accordance with an error value produced by an integrating error amplifier 245. Error amplifier 245 has its non-inverting (+) input 246 coupled to the output 243 of A channel differential sensing amplifier 240, while its inverting (−) input 247 is coupled to the output 253 of a B channel differential sensing amplifier 250.

The output of the pulse width control circuit 225 is coupled to a second B channel gate control logic section 260 which, like the A channel control logic section 210, is of conventional configuration, and is used to apply gate or switching control signals to the output channel switch 40B of the second pair of A and B channel switching circuits 40A and 40B. For this purpose, the gate control logic section 260 supplies a first output 261 through a first driver amplifier 270 to the UGATEB output for application to the gate of an upper MOSFET switch 41B of the B channel switching circuit 40B. Driver amplifier 270 is coupled to a boot voltage pin BOOTB and to a PHASEB pin at which operational control voltages are coupled. Gate control logic section 260 further supplies a second (inverted) output 262 through a second driver amplifier 280 to the LGATEB output for application to the gate of a lower MOSFET switch 42B of the B channel switching circuit 40B.

Output current monitoring for channel B is accomplished in the same manner as for channel A, by coupling the downstream end node 265 of an output inductor 266 to an ISENB− port, which is coupled to the inverting (−) input 251 of a B channel differential sensing amplifier 250. In addition, a node 267 at the common connection of a resistor 268 and a capacitor 269, which are coupled in parallel with the output inductor 266 in such a fashion that a voltage is created across the capacitor that is proportional to the current in the inductor, is coupled to an ISENB+ port, for application to the non-inverting (+) input 252 of the B channel differential sensing amplifier 250. In order to derive a measure of the average of the output currents produced by the A and B channels, the outputs 243 and 253 of differential sense amplifiers 240 and 250 are coupled to an adder 290 to produce a composite sensed value, which is averaged via a divide-by-two divider 292 and coupled to a current generator 295, the output of which is coupled to the IOUT port 22.

Figure 3:
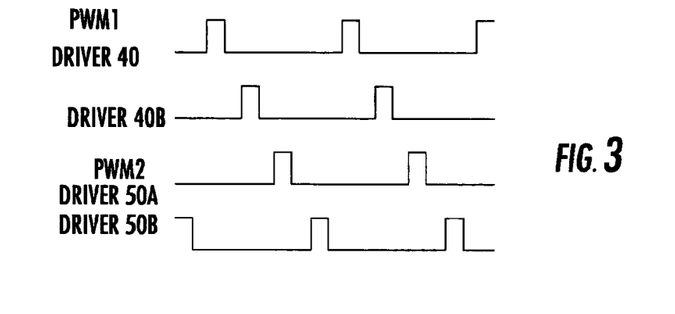
FIG. 3 is a timing diagram associated with the operation of the embodiment of FIG. 1.

The operation of the dual driver circuitry of FIG. 2 may be understood with reference to the timing diagram of FIG. 3. As described above, each of the two dual drivers 20 and 30 contains two output channel drivers (a channel A driver section (containing switching circuit channels 40A and 50A) and a channel B driver section (containing switching circuit channels 40B and 50B)). For the dual driver architecture of FIG. 2, a single input port 21 is coupled to receive a respective PWM signal from the controller 10; the respective PWM signals PWM1 and PWM2 directly control the switching operation of the output channels 40A and 50A, while the delayed and pulse width-adjusted versions of these respective PWM signals control the switching operation of the output channel switching circuits 40B and 50B.

As pointed out above, the widths of the channel B PWM pulse is adjusted relative to that of the channel A PWM pulse in accordance with the error signal produced by error amplifier 245. Where the output of amplifier 245 is positive, it is inferred that the A channel current is greater than that of the B channel, so that pulse width control circuit 225 increases the width of the delayed PWM signal applied to gate control logic section 260. Conversely, where the output of amplifier 245 is negative, it is inferred that the A channel current is less than that of the B channel, so that pulse width control circuit 225 decreases the width of the delayed PWM signal applied to the channel B gate control logic section 260.

The actual width of the PWM signal applied to PWM port 21 of a respective dual channel driver is based in part upon a comparison by the controller 10 of the IOUT signals supplied thereto from the various multi-channel drivers. For the four phase embodiment of FIG. 1, controller 10 is operative to compare the average current signals coupled to its current sense input ports ISEN1+ and ISEN2+ and to adjust the pulse widths of its two output PWM signals PWM1 and PWM2 accordingly.

It should be noted that the dual channel driver interface of the present invention is not limited to use with only a system having an even number of phases (such as the four phase system of FIG. 1). It may also be used for a system having an odd number of phases, such as but not limited to the three phase system shown in FIG. 4. A comparison of FIGS. 1 and 4 reveals that the two systems differ by the fact that the lower dual gate driver 30 of FIG. 1 has been replaced in FIG. 4 by a conventional single driver stage 70 used to drive single output switching channel 80 containing an upper MOSFET switch 81 and a lower MOSFET switch 82. As a non-limiting example, the single driver stage 70 may comprise an ISL6605 driver stage manufactured by Intersil Corp. In this embodiment, sense nodes 85 and 86 are coupled to the current sense ports ISEN2+ and ISEN2− of the controller via current sense representative voltage signalling conductor traces 91 and 92.

Figure 4:
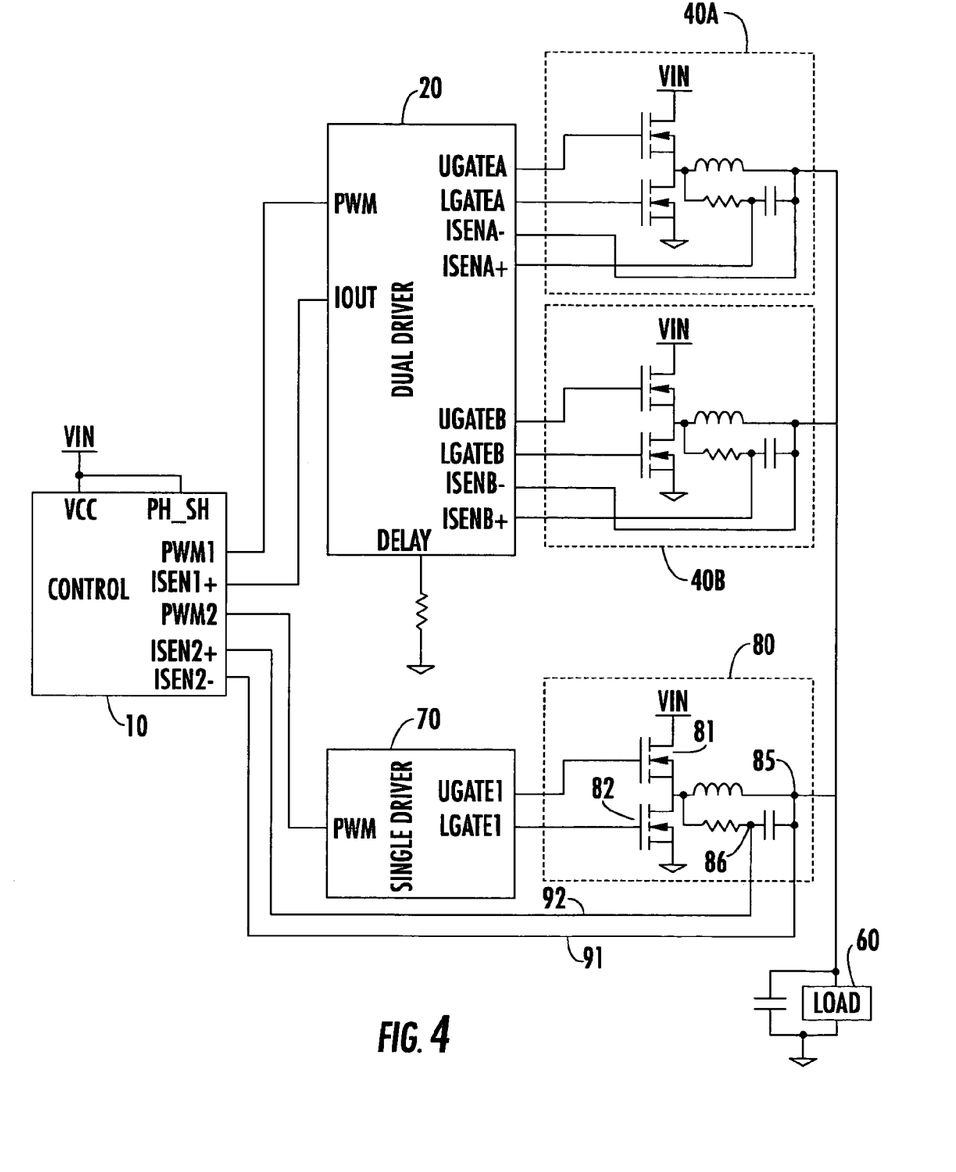
FIG. 4 is an overall block diagram of a three-phase DC-DC converter system in accordance with the present invention.
Figure 5:
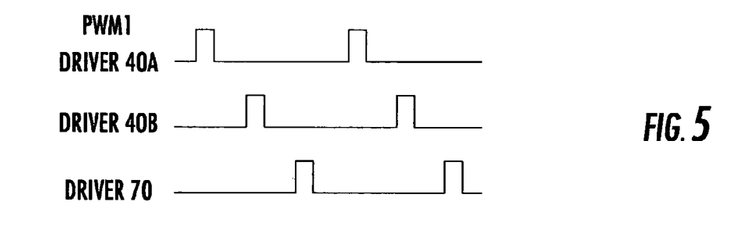
FIG. 5 is a timing diagram associated with the operation of the three-phase embodiment of FIG. 4.

FIG. 5 is a timing diagram associated with the operation of the three phase embodiment of FIG. 4. It may be noted that for the three-phase converter, the intervals between the PWM signals are equally spaced, with the separation from the PWM1 signal for channel A to the PWM1 signal for channel B being one half the separation from the PWM1 signal for channel B to the PWM1 signal for channel A. Likewise, the separation from the PWM1 signal for channel A to the PWM1 signal for channel B is the same as the separation from the PWM2 signal for driver 70 to the PWM1 signal for channel A.

It should be noted that the above-described embodiment is not limited to the implementation shown and described, but alternative equivalents may be employed, wherein the logic is reversed. In such implementations the controller 10 may be programmed with a fixed interval between 'falling' rather than 'rising' edges of the PWM signals. In this case the B stage of the dual driver will turn the power semiconductor switch "off" a programmable time period after the falling edge of the first PWM signal. The B stage of the driver will turn the semiconductor switch "on" when the dual driver determines that the current in the B channel is equal to the current in the A channel.

In accordance with a further implementation, the controller 10 may be modified to accept a signal that causes the programmed fixed time period between the first PWM signal and the second PWM signal to be half of the fixed time period between the other PWM signals. This means that a single driver IC connected to the first PWM can have the same phase relationship to all the other channels that all the other channels have to each other. This technique allows for an odd number of phases. Note that the signal is a two-state (digital) signal employing pin PH_SH of controller 10. This simplifies implementation of the controller.

Figure 6:
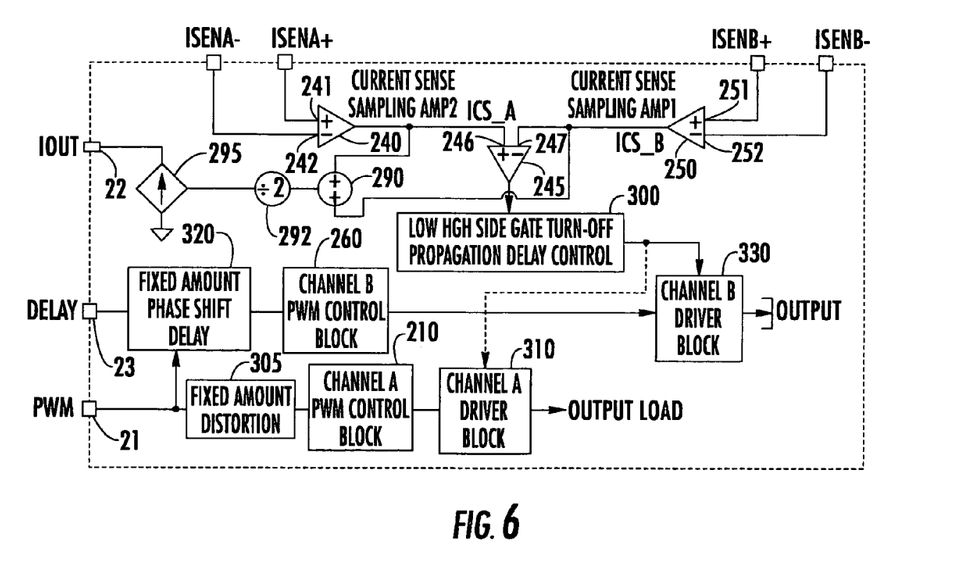
FIG. 6 shows the circuit architecture of a second embodiment of a respective dual channel driver of the DC-DC converter architecture of FIG. 1.

As described above, in the circuit architecture of a respective dual channel driver shown in FIG. 2, the output of the error amplifier 245 is used to adjust the width of the channel B PWM signal, as output by delay circuit 215, prior to its being applied to the channel B gate control logic section 260. The output of the channel B gate control logic section is then used to control the gate drive signals for a respective one of switching circuit channels 40B and 50B. In accordance with a second embodiment of a respective dual channel driver diagrammatically illustrated in FIG. 6, the output of the error amplifier 245 is used to control gate turn-off propagation delay of high side gate drive (for trailing edge PWM signals) or turn-off-delay of low side gate drive (for leading edge PWM signals), so as to provide current balance between the A and B channels. In the embodiment of FIG. 6, the pulse width control circuit 225 of FIG. 2 is replaced by combinational logic 300, which is effective to implement the trailing edge-or leading edge-based pulse width control timing control illustrated in the respective timing diagrams of FIGS. 7 and 8, respectively. The output of timing control logic 300 is coupled to either the channel B driver circuitry or to both the channel A and channel B driver circuitry, as will be described.

More particularly, in the embodiment of FIG. 6, the PWM input port 21, to which the PWM control signal from the system controller 10 is supplied, is coupled through a fixed delay element 305 to the channel A control logic section 210. Delay element 305 delays the PWM signal by a fixed amount of delay that is selected to accommodate inherent signal propagation delay (but not the programmed delay) through a delay 320 installed in the B channel signal propagation path. The output of delay element 305 is coupled to the channel A control logic section 210, the output of which is coupled to channel A driver circuitry 310, that drives load 100.

The PWM input port 21 is further coupled to a programmable delay 320 that imparts a prescribed amount of delay to the PWM signal supplied by the controller 10 in accordance with the number of multichannels being driven by the controller. The output of delay 320 is coupled to the channel B control logic section 260, which has its output coupled to channel B driver circuitry 330 to which the output of the timing control logic 300 is supplied. Operation of the embodiment of FIG. 6 may be understood by reference to the timing diagrams of FIGS. 7 and 8, which are respectively associated with the output MOSFETs' gate turn-off propagation delay of low side gate drive (for trailing edge PWM signals) and turn-off delay of high side gate drive (for leading edge PWM signals).

Figure 7:
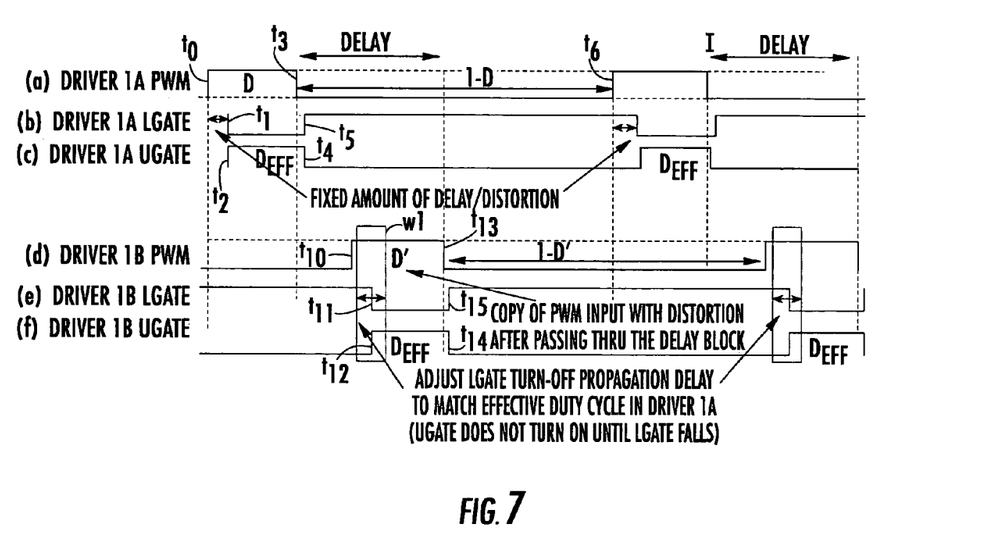
FIG. 7 is a timing diagram associated with the operation of the dual channel driver of FIG. 6 for trailing edge-based signaling.

Considering first the case of controlling the output MOSFETs' gate turn-off propagation delay of low side gate drive (for trailing edge PWM signals), signal trace (a) of FIG. 7 corresponds to the PWM signal as supplied to PWM port 21 by the controller 10, that goes high beginning at time t0 and has a pulse width D relative to its overall length of D+(1−D) or one cycle of a PWM signal. As shown at time t1 in signal trace (b), after the end of the delay imparted by delay 305, the drive supplied by channel A driver 310 goes low, turning off the low side MOSFET of channel A. Next, at shown as time t2 in signal trace (c), the gate drive to the high side MOSFET is then turned on, as the output of its drive supplied by channel A driver 310 goes high. At the end of the duty cycle or width D of the PWM pulse at time t3 (signal trace (a)), the gate drive to the high side MOSFET supplied by the channel A driver 310 goes low-turning off the high side channel A MOSFET as shown at time t4 in signal trace (c). Thereafter, as shown at time t5 in signal trace (b), the low side channel A MOSFET is turned on, as its gate drive goes from low to high. This cycle repeats itself for subsequent PWM signals supplied by the controller 10, as shown beginning at time t6 in signal trace (a).

On the B channel side, due to the programmable delay imparted by delay 320 (plus distortion inherent in passing through that delay), the leading edge of the PWM signal from the controller 10 is delayed a prescribed delay period or phase offset, as shown at time t10 in signal trace (d). Next, as shown at time t11 in signal trace (e), at the end of the delay imparted by delay 305, after a prescribed period as dictated by timing control logic 300, the drive supplied by channel B driver 330 goes low, turning off the low side MOSFET of channel B. Where the current sense inputs to error amplifier 245 indicate that the current drawn by channel A is less than that drawn by channel B, the trailing edge of the low side gate drive signal trace (e) will go low later than the case where the current being drawn by channel A is greater than that drawn by channel B. In the latter case, the trailing edge of the low side gate drive signal trace (e) at time t11 will go low earlier, as shown by the adjustment window W1.

Next, as shown at time t12 in signal trace (f), the gate drive to the channel B high side MOSFET is turned on, as the output of its drive supplied by channel B driver 330 goes high. At the end of the duty cycle or width D' of the PWM pulse at time t13 in signal trace (d), the gate drive to the high side MOSFET supplied by the channel B driver 330 goes low at time t14—turning off the high side channel B MOSFET. Thereafter, as shown at time t15 in signal trace (e), the low side channel E MOSFET is turned on, as its gate drive goes from low to high. As in the case of channel A this cycle repeats itself for subsequent PWM signals supplied by the controller 10, as shown.

Considering next, the case of controlling the output MOSFETs' gate turn-off delay of the high side gate drive for leading edge PWM signals, signal trace (a) of FIG. 8 again corresponds to the PWM signal (also shown as signal trace (a) in FIG. 7, described above), as supplied to PWM port 21 by the controller 10, having a pulse width D relative to one cycle of the PWM signal that begins at time t0 and changes state at time t3. As shown at time t1 in signal trace (b), in response to the PWM signal going high, the drive supplied by channel A driver 310 goes low, turning off the low side MOSFET of channel A. Then, as shown at time t2 of signal trace (c), the gate drive to the high side MOSFET is turned on, as the output of its drive supplied by channel A driver 310 goes high.

Figure 8:
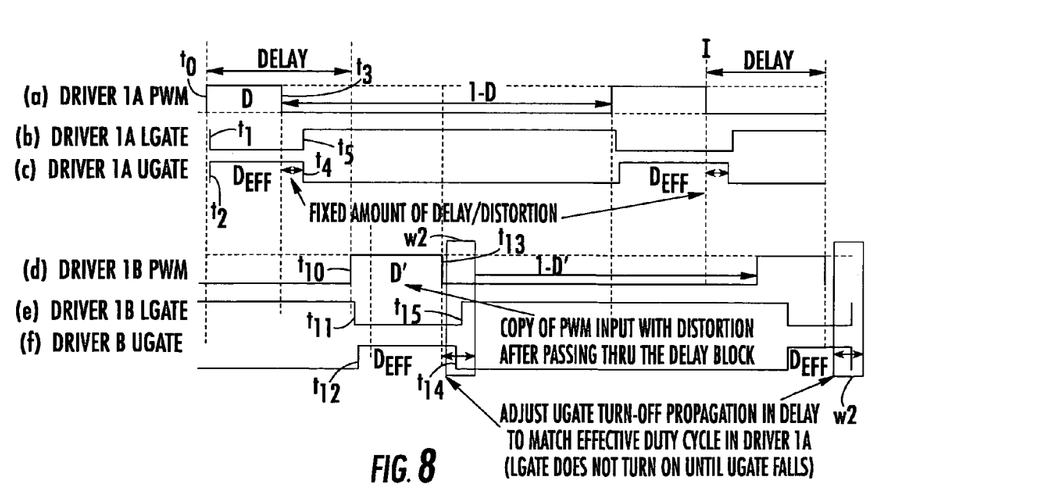
FIG. 8 is a timing diagram associated with the operation of the dual channel driver of FIG. 6 for leading edge-based signaling.

As further shown at time t4 of signal trace (c), after the propagation delay imparted by distortion delay 305, subsequent to the termination of the duty cycle or width D of the PWM pulse at time t3, the gate drive to the high side MOSFET supplied by the channel A driver 310 goes low-turning off the high side channel A MOSFET. Then, as shown at time t5 in signal trace (b), the low side channel A MOSFET is turned on, as its gate drive supplied by output driver 310 goes from low to high. This cycle repeats itself for subsequent PWM signals supplied by the controller 10, as shown.

On the B channel side, due to the programmable delay imparted by delay 320 (plus distortion inherent in passing through that delay), the leading edge of the PWM signal from the controller 10 is delayed a prescribed delay period or phase offset, as shown at time t10 of signal trace (d). Next, as shown at time t11 of signal trace (e), the drive supplied by channel B driver 330 goes low, turning off the low side MOSFET of channel B. Next, as shown at time t12 of signal trace (f), the gate drive to the channel B high side MOSFET is turned on, as the output of its drive supplied by channel B driver 330 goes high.

At the end of the duty cycle or width D' of the PWM pulse (signal trace (d)), at time t13, the PWM signal goes low. Thereafter, a prescribed interval after the trailing edge of the PWM signal, as controlled by the timing logic 300, the gate drive to the high side MOSFET supplied by the channel B driver 330 goes low at time t14—turning off the high side channel B MOSFET. Then, as shown at time t15 in signal trace (e), the low side channel B MOSFET is turned on, as its gate drive goes from low to high. Where the current sense inputs to error amplifier 245 indicate that the current drawn by channel A is less than that drawn by channel B, the trailing edge of the high side gate drive signal trace (f) will go low earlier within the adjustment window W2 than the case where the current being drawn by channel A is greater than that drawn by channel B. In the latter case, the trailing edge of signal trace (f) will go low later.

While the embodiment of FIG. 6 has been described for the case of providing MOSFET gate output control of only of the channels (the B channel driver in the present example) for either of leading edge or trailing edge based conditions, it is to be observed that the turn-off propagation delay of high side or low side drive of both the A channel driver and the B channel driver may be simultaneously programmed by comparing each channel's current to the average current of both channels. For this implementation, the timing logic 300 supplies an addition output control to the channel A driver 310, as shown in broken lines in FIG. 6.

As will be appreciated from the foregoing description, the dual driver-based, DC-DC converter of the present invention successfully addresses both the problem of excessive controller pin count and that of long, sensitive signal lines in a noisy environment. In addition, it provides a means of achieving current balance between multiple channel drivers. The excessive pin count problem is substantially reduced by increasing (doubling) both the number of power channels being controlled by a single PWM signal, and the number of power channels transmitting current-sense signals to a single current-sense input. The integrity of the current-sense signals is maintained by placing the current sense circuitry within the dual driver interface. Unlike the controller, the dual drivers can conveniently be placed close to the sense points.

Pursuant to a second embodiment of a respective dual channel driver, the output of the error amplifier is used to control gate turn-off propagation delay of high side gate drive (for leading edge PWM signals) or turn-off delay of low side gate drive (for trailing edge PWM signals), so as to provide current balance between the A and B channels. To this end, the pulse width control circuit of the first embodiment is replaced by combinational logic, which is effective to implement the leading edge- or trailing edge-based pulse width control timing control. The output of timing control logic may be coupled to either the channel B driver circuitry or to both the channel A and channel B driver circuitry.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A multiphase DC-DC converter comprising:
a plurality of switched converter channels, outputs of which are combined to provide a composite output DC voltage waveform for delivery to a load;
a multiphase driver interface coupled to receive a single pulse width modulation (PWM) signal from a converter controller and being operative to generate therefrom a plurality of PWM signals mutually separated in time, and being coupled to control switching of respective ones of said plurality of switched converter channels;
a current sensing circuit which is operative to sense current conditions at selected portions of said plurality of switched converter channels, and to produce a single output representative of said current conditions sensed at said selected portions of said plurality of switched converter channels; and
a single conductor through which said single output from said current sensing circuit is coupled to a current sense port of said converter controller.

2. The multiphase DC-DC converter according to claim 1, wherein said multiphase driver interface is coupled to receive said single pulse width modulation (PWM) signal from said converter controller and is operative to delay said single PWM signal by a prescribed delay as a delayed PWM signal, and to control switching of respective ones of said plurality of switched converter channels in accordance with said single PWM signal and said delayed PWM signal.

3. The multiphase DC-DC converter according to claim 2, wherein said multiphase driver interface operative to control pulse width of said delayed PWM signal in accordance with the operation of said current sensing circuit.

4. The multiphase DC-DC converter according to claim 1, wherein said current sensing circuit is operative to differentially sense current conditions at said selected portions of said plurality of switched converter channels, and to produce said single output representative of said current conditions differentially sensed at said selected portions of said plurality of switched converter channels.

5. The multiphase DC-DC converter according to claim 4, wherein said current sensing circuit is operative to generate voltages representative of said differentially sensed current conditions at said selected portions of respectively different ones of said plurality of switched converter channels, and to combine said voltages into a composite from which said single output is produced.

6. The multiphase DC-DC converter according to claim 3, wherein said current sensing circuit is operative to generate voltages representative of said differentially sensed current conditions at said selected portions of respectively different ones of said plurality of switched converter channels, and to differentially combine said voltages to produce an error signal for adjusting the pulse width of said delayed PWM signal.

7. The multiphase DC-DC converter according to claim 6, wherein said current sensing circuit includes an integrating differential amplifier to which said voltages representative of said differentially sensed current conditions at said selected portions of respectively different ones of said plurality of switched converter channels are coupled, and being operative to produce said error signal for adjusting the pulse width of said delayed PWM signal.

8. The multiphase DC-DC converter according to claim 1, wherein said current sensing circuit is operative to sense current conditions at selected portions of said plurality of switched converter channels, and to produce a single output current representative of said current conditions sensed at said selected portions of said plurality of switched converter channels, said single output current being coupled over said single conductor to said current sense port of said converter controller.

9. The multiphase DC-DC converter according to claim 1, wherein said multiphase driver interface is coupled to receive said single PWM signal from said converter controller and is operative to delay said single PWM signal by a first delay as a first delayed PWM signal associated with signal propagation delay through components of said multiphase driver interface, and to delay said single PWM signal by a second delay associated with the number of said plurality of switched converter channels as a second delayed PWM signal, and to control switching of respective ones of said plurality of switched converter channels in accordance with said first and second delayed PWM signals.

10. The multiphase DC-DC converter according to claim 9, wherein said multiphase driver interface is operative to control switching of a first converter channel in accordance with said first delayed PWM signal and to control switching of a second converter channel in accordance with said second delayed signal that is controllably offset in time relative to a selected one of a leading edge and a falling edge of said single PWM signal in a manner that is effective to balance current flow between said first and second converter channels.

11. The multiphase DC-DC converter according to claim 10, wherein said second delayed signal is controllably offset in time relative to said leading edge of said single PWM signal.

12. The multiphase DC-DC converter according to claim 10, wherein said second delayed signal is controllably offset in time relative to said trailing edge of said single PWM signal.

13. The multiphase DC-DC converter according to claim 9, wherein said multiphase driver interface is operative to control switching of a first converter channel in accordance with said first delayed PWM signal and to control switching of a second converter channel in accordance with said second delayed signal, and wherein said first and second delayed signals are controllably offset in time relative to a selected one of a leading edge and a falling edge of said single PWM signal in a manner that is effective to balance current flow between said first and second converter channels.

14. A dual phase DC-DC converter comprising:
first and second switched converter channels, outputs of which are combined to provide a dual phase output voltage for delivery to a load;
a converter controller which is operative to produce a pulse width modulation (PWM) signal, and being operative to controllably adjust said PWM signal in accordance with monitored current conditions at selected portions of said first and second switched converter channels;
a dual phase driver interface, coupled to receive said PWM signal via a first conductor from said converter controller, and being operative to generate therefrom first and second PWM signals, which are mutually separated in time and are coupled to control switching of said first and second switched converter channels, said dual phase driver interface including a current sensing circuit, which is operative to sense current conditions at selected portions of said first and second switched converter channels, and producing a single output representative of said current conditions sensed at said selected portions of said plurality of switched converter channels; and
a second conductor through which said single output from said current sensing circuit is coupled to a current sense port of said converter controller, said converter controller being operative to controllably adjust said PWM signal in accordance with said single output from said current sensing circuit as coupled to said current sense port.

15. The dual phase DC-DC converter according to claim 14, wherein said dual phase driver interface is coupled to receive said PWM signal from said converter controller and is operative to delay said PWM signal by a prescribed delay as a delayed PWM signal, and to control switching of said first and second switched converter channels in accordance with said PWM signal and said delayed PWM signal, respectively.

16. The dual phase DC-DC converter according to claim 15, wherein said dual phase driver interface operative to control the pulse width of said delayed PWM signal in accordance with the operation of said current sensing circuit.

17. The dual phase DC-DC converter according to claim 16, wherein said current sensing circuit is operative to differentially sense current conditions at said selected portions of said first and second switched converter channels, and to produce said single output representative of said current conditions differentially sensed at said selected portions of said first and second switched converter channels.

18. The dual phase DC-DC converter according to claim 14, wherein said dual phase driver interface is coupled to receive said PWM signal from said converter controller and is operative to delay said single PWM signal by a first delay as a first delayed PWM signal, and to delay said PWM signal by a second delay as a second delayed PWM signal, and to control switching of said first and second of switched converter channels in accordance with said first and second delayed PWM signals, respectively.

19. The dual phase DC-DC converter according to claim 18, wherein said multiphase driver interface is operative to control switching of said first converter channel in accordance with said first delayed PWM signal and to control switching of said second converter channel in accordance with said second delayed signal that is controllably offset in time relative to a selected one of a leading edge and a falling edge of said PWM signal in a manner that is effective to balance current flow between said first and second converter channels.

20. The dual phase DC-DC converter according to claim 19, wherein said second delayed signal is controllably offset in time relative to said leading edge of said single PWM signal.

21. The dual phase DC-DC converter according to claim 19, wherein said second delayed signal is controllably offset in time relative to said trailing edge of said single PWM signal.

22. The dual phase DC-DC converter according to claim 18, wherein said multiphase driver interface is operative to control switching of said first converter channel in accordance with said first delayed PWM signal and to control switching of said second converter channel in accordance with said second delayed signal, and wherein said first and second delayed signals are controllably offset in time relative to a selected one of a leading edge and a falling edge of said single PWM signal in a manner that is effective to balance current flow between said first and second converter channels.

23. A multiphase DC-DC converter comprising:
a plurality of switched converter channels, outputs of which are combined to provide a multiphase output voltage for delivery to a load;
a converter controller which is operative to produce a plurality of pulse width modulation (PWM) signals, and to controllably adjust said PWM signals in accordance with monitored current conditions at selected portions of said plurality of switched converter channels; and
a plurality of dual channel driver interfaces, a respective dual phase driver interface being coupled to receive one of said PWM signals from said converter controller, and being operative to generate therefrom first and second PWM signals, which are mutually separated in time in accordance with the number of phases of said multiphase DC-DC converter, and are coupled to control switching of a respective pair of switched converter channels, said dual phase driver interface including a current sensing circuit, which is operative to sense current conditions at selected portions of said respective pair of switched converter channels, and producing a single output representative of said current conditions sensed at said selected portions of said respective pair of switched converter channels, said single output from said current sensing circuit being coupled to an associated current sense port of said converter controller, said converter controller being operative to controllably adjust a respective PWM signal in accordance with outputs from current sensing circuits of said plurality of dual channel driver interfaces.

24. The multiphase phase DC-DC converter according to claim 23, wherein said respective dual phase driver interface is coupled to receive a respective one of said plurality of PWM signals from said converter controller, and is operative to delay said respective PWM signal by a prescribed delay as a delayed PWM signal, and to control switching of said first and second ones of said respective pair of switched converter channels in accordance with said respective PWM signal and said delayed PWM signal, respectively.

25. The multiphase DC-DC converter according to claim 24, wherein said respective dual phase driver interface operative to control the pulse width of said delayed PWM signal in accordance with the operation of said current sensing circuit.

26. The multiphase DC-DC converter according to claim 25, wherein said current sensing circuit is operative to differentially sense current conditions at said selected portions of said first and second switched converter channels, and to produce said single output representative of said current conditions differentially sensed at said selected portions of said first and second switched converter channels.

27. The multiphase DC-DC converter according to claim 23, wherein said respective dual phase driver interface is coupled to receive a PWM signal from said converter controller and is operative to delay said single PWM signal by a first delay as a first delayed PWM signal, and to delay said PWM signal by a second delay as a second delayed PWM signal, and to control switching of said first and second of switched converter channels in accordance with said first and second delayed PWM signals, respectively.

28. The multiphase DC-DC converter according to claim 27, wherein said multiphase driver interface is operative to control switching of said first converter channel in accordance with said first delayed PWM signal and to control switching of said second converter channel in accordance with said second delayed signal that is controllably offset in time relative to a selected one of a leading edge and a falling edge of said PWM signal in a manner that is effective to balance current flow between said first and second converter channels.

29. The multiphase DC-DC converter according to claim 28, wherein said second delayed signal is controllably offset in time relative to said leading edge of said single PWM signal.

30. The multiphase DC-DC converter according to claim 28, wherein said second delayed signal is controllably offset in time relative to said trailing edge of said single PWM signal.

31. The multiphase DC-DC converter according to claim 27, wherein said multiphase driver interface is operative to control switching of said first converter channel in accordance with said first delayed PWM signal and to control switching of said second converter channel in accordance with said second delayed signal, and wherein said first and second delayed signals are controllably offset in time relative to a selected one of a leading edge and a falling edge of said single PWM signal in a manner that is effective to balance current flow between said first and second converter channels.

32. A dual channel interface for a multiphase DC-DC converter having a plurality of switched converter channels, outputs of which are combined to provide a multiphase output voltage for delivery to a load, comprising
an input port coupled to receive a pulse width modulation (PWM) signal from a converter controller, which is operative to controllably adjust said PWM signal in accordance with monitored current conditions at selected portions of said plurality of switched converter channels; and
a dual channel driver coupled to receive said PWM signal from said converter controller, and being operative to generate therefrom first and second PWM signals, which are mutually separated in time in accordance with the number of phases of said multiphase DC-DC converter, and are coupled to control switching of a respective pair of switched converter channels, said dual channel driver including a current sensing circuit, which is operative to sense current conditions at selected portions of said respective pair of switched converter channels, and producing a single output representative of said current conditions sensed at said selected portions of said respective pair of switched converter channels, said single output from said current sensing circuit being coupled to an associated current sense port of said converter controller, and wherein said dual channel driver is operative to define parameters of said first and second PWM signals in a manner that is effective to balance current flow in said respective pair of switched converter channels.

33. The dual channel interface according to claim 32, wherein said dual channel driver is operative to control switching of said first converter channel in accordance with said first delayed PWM signal and to control switching of said second converter channel in accordance with said second delayed signal that is controllably offset in time relative to a selected one of a leading edge and a falling edge of said PWM signal in a manner that is effective to balance current flow between said first and second converter channels.

34. The dual channel interface according to claim 33, wherein said second delayed signal is controllably offset in time relative to said leading edge of said single PWM signal.

35. The dual channel interface according to claim 33, wherein said second delayed signal is controllably offset in time relative to said trailing edge of said single PWM signal.

36. The dual channel interface according to claim 32, wherein said dual channel driver is operative to control switching of said first converter channel in accordance with said first delayed PWM signal and to control switching of said second converter channel in accordance with said second delayed signal, and wherein said first and second delayed signals are controllably offset in time relative to a selected one of a leading edge and a falling edge of said single PWM signal in a manner that is effective to balance current flow between said first and second converter channels.

* * * * *